(No Model.)
D. PEGLAW.
TREADLE.
No. 513,595. Patented Jan. 30, 1894.
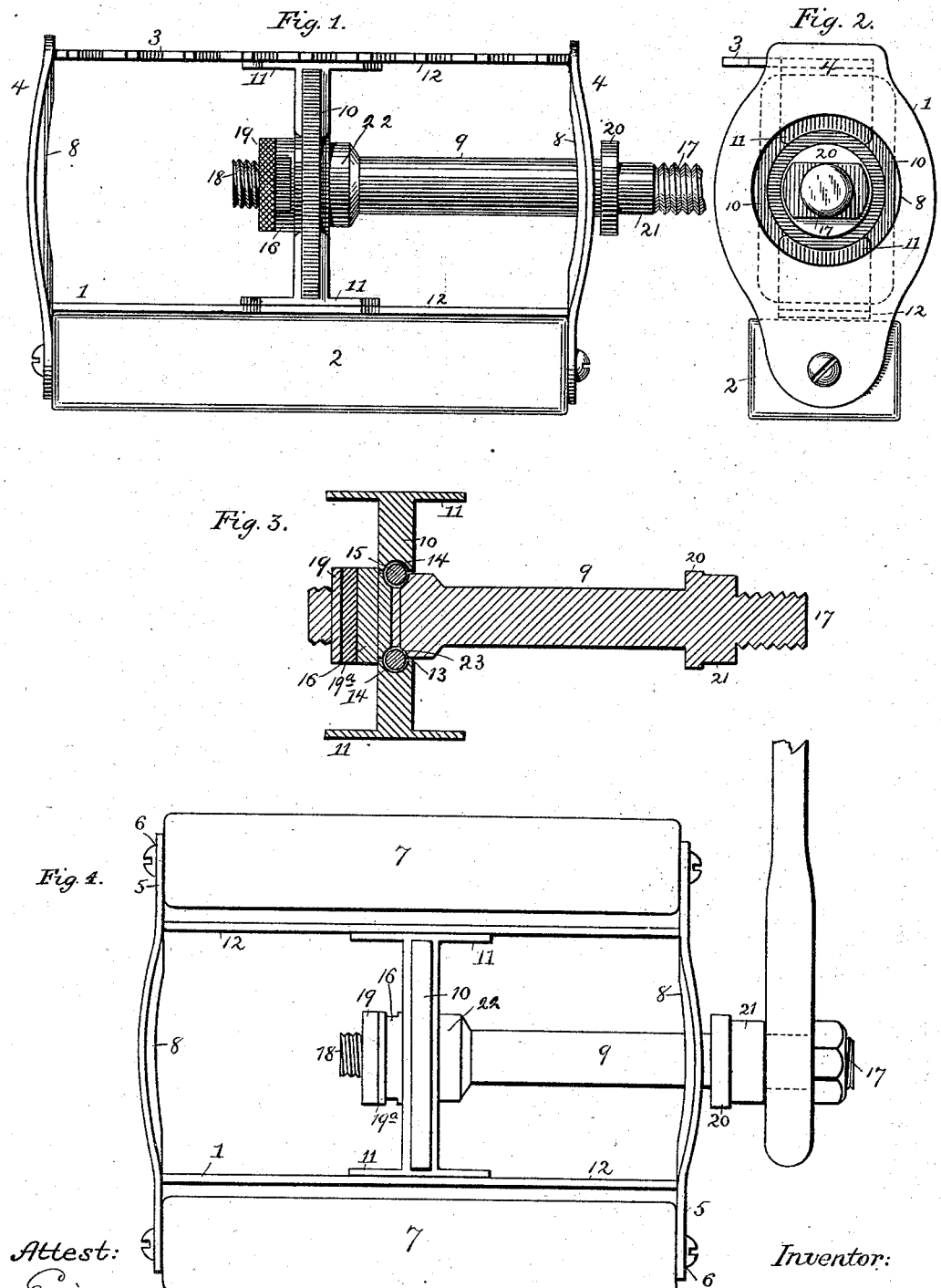

UNITED STATES PATENT OFFICE.

DANIEL PEGLAW, OF BUFFALO, NEW YORK.

TREADLE.

SPECIFICATION forming part of Letters Patent No. 513,595, dated January 30, 1894.

Application filed March 17, 1893. Serial No. 466,414. (No model.)

*To all whom it may concern:*

Be it known that I, DANIEL PEGLAW, a citizen of the United States, residing at Buffalo, in the county of Erie and State of New York, have invented certain new and useful Improvements in Treadles; and I do hereby declare the following to be a full, clear, and exact description of the invention, such as will enable others skilled in the art to which it appertains to make and use the same.

This invention relates to certain improvements, as hereinafter described and claimed, in pedals for bicycles, tricycles and similar vehicles and machinery whereby a single, central, ball-bearing support is afforded thereto in contradistinction to a plurality of ball-bearing supports.

In the accompanying drawings:—Figure 1 represents a plan view of a rat-trap pedal constructed according to my invention. Fig. 2 represents an end view of the same. Fig. 3 represents a sectional view of the bearing frame and shaft. Fig. 4 represents a view of my improved pedal supplied with the ordinary rubber treads.

The design of my invention is produce a treadle for velocipedes generally, and for light machinery, whereby less material than is customary will be employed in its construction; the treadle, or pedal, will be lighter, and whereby a single, central, ball-bearing support will be afforded said treadle or pedal in contradistinction to a double bearing—one at each end, and whereby said treadles, or pedals, and their supporting shafts will be interchangeable and capable of use at either side of the machine.

1 represents the shell or frame, 2 the counterbalance or weight, and 3 the rat-trap pedal which latter may either be formed integrally with the shell or be formed separately therefrom and attached thereto by screws or similar means; similarly the counterbalance, 2, may either be formed integrally with or separately from and secured to the shell 1. Where the shell, 1, is solely adapted for a rat-trap pedal, as 3, the ends, 4, will at their tops be diminished in height so as to extend only to, or about to, a line flush with the tread. Where, however, it is desired said ends, 4, may be cast or otherwise formed with ears 5 having pivot-holes, 6, within which the ordinary rotatable rubber pedals, 7, may be pivotally journaled. My improved treadle, it will thus be seen, is interchangeably adapted for use in connection with either rat-trap or rotary rubber treads.

In lieu of a metal tread plate as 3, or suitably attached thereto, a strip of rubber may be employed upon which the foot of the operator may rest. The end plates 4, have openings, 8, through which the pedal, or treadle, supporting shaft 9 may be passed to the central bearing.

10 represents the central bearing shell or plate for the treadle shaft 9. This shell or plate may either be cast or otherwise formed integrally with the shell or frame 1 or it may be formed separately therefrom and suitably attached thereto. When formed separately from the frame 1 said central bearing shell or plate 10 is formed, at its top and bottom, with outwardly-extending lips or flanges 11 which are riveted or otherwise secured to the top and bottom longitudinal plates, 12, of the frame 1. This central bearing shell 10 has a central bore 13 to receive the treadle shaft and cone said bore being circumferentially bored or recessed in U-shape in cross-section as shown at 14, to receive and hold the balls 15 constituting, with the cone, 16, the ball-bearing. By forming the circumferential recess of U-shape in cross-section the balls are securely retained in position without interfering with their operative qualities. The treadle-supporting shaft 9 is threaded at each end, the thread 17 at one end serving to connect with the crank of the wheel (not shown) and the thread 18 at the other end serving to receive the cone 16 and the cone-retaining nut 19.

19ª represents a washer interposed between the cone 16 and the nut 19.

20 represents a stop-collar or bearing for the crank connection. This stop-collar has flat faces 21 which serve as wrench grips.

22 represents a collar on the shaft, adjacent to the thread 18, which abuts against the central bearing shell 10 and serves as a gage for insuring the correct position of said shaft 9 said collar being formed, at its inner end, with a beveled face 23 which enters within the bore 13 into contact with the inner end of the cone so as to form, with the bevel of said cone, a frictionless bearing for the balls 15. The outer end of the cone 16 may either have flat wrench-gripping faces or it may be milled as desired.

From the foregoing, referring to the drawings, it will be seen that my treadle is adapted for use in connection with velocipedes of every description and that it can equally well be employed in connection with mechanism generally employing pedals or treadles.

It will be seen that but a single ball-bearing is employed, instead of two, thereby effecting a saving in the quantity of material used, in the labor employed in construction and in the cost of production; that treadles or pedals constructed according to my invention are lighter than where the pedal-supporting shaft extends entirely through the shell and where a plurality of ball-bearings are employed. Also, that the pedal shaft can be inserted at either end of the pedal frame, thereby adapting each pedal for use at either side of the machine. By arranging the bearing shell at the center the pedal frame is additionally braced at and a firm support afforded at that portion on which the greatest strain is exerted by the foot of the user.

What I claim is—

1. A treadle, consisting of a shell or frame consisting of horizontal top and bottom plates, transversely-bored vertical end pieces connecting said top and bottom plates and a central vertical shell or plate connecting and bracing said top and bottom plates and having a circumferentially-grooved ball-receiving bore, a treadle-supporting shaft connected at one end with the customary crank and at its other end having bearing in the central shell, a cone consisting of a bevel-ended stop collar secured to said shaft and a bevel-ended nut adjustable on said shaft, and friction balls, contained within said grooved bore, substantially as and for the purpose set forth.

2. A treadle consisting of a shell or frame composed of vertical end pieces having transverse openings therein and longitudinal top and bottom plates, a central bearing connected with said top and bottom plates and having a central bore having a circumferential ball-receiving recess of U-shape in cross-section, balls contained within said recess, a treadle-supporting shaft extending from one end of said frame to the central bearing therein, and having a bevel-ended stop collar and a cone and cone-clamping nut mounted on said shaft, substantially as and for the purpose set forth.

In testimony whereof I affix my signature in presence of two witnesses.

DANIEL PEGLAW.

Witnesses:
THOMAS F. PEGLAW,
ELIZBETH HUGHES.